United States Patent [19]
Williams et al.

[11] Patent Number: 6,107,382
[45] Date of Patent: Aug. 22, 2000

[54] PROCESS FOR THE PRODUCTION OF IMPROVED PSA'S

[75] Inventors: Charles R. Williams, Lock Haven; Colin C. Smith, State College; James R. Bodwell, Boalsburg; James P. Akeley, Lock Haven, all of Pa.; Ivan S. Lee, Arcadia, Calif.

[73] Assignee: Avery Dennison Corporation, Pasadena, Calif.

[21] Appl. No.: 08/904,083

[22] Filed: Jul. 31, 1997

[51] Int. Cl.$^7$ ...................................................... C08F 2/22
[52] U.S. Cl. ........................... 524/272; 524/804; 524/832; 524/833; 524/836
[58] Field of Search ...................................... 524/804, 832, 524/833, 836, 270, 272; 427/213.3, 213.31, 213.34; 428/402.241; 264/4.1, 4.32, 4.33, 4.7

[56] References Cited

U.S. PATENT DOCUMENTS

| | | | |
|---|---|---|---|
| 3,248,356 | 4/1966 | Snyder . | |
| 4,371,659 | 2/1983 | Druschke et al. | 524/599 |
| 4,948,822 | 8/1990 | Iovine et al. | 523/201 |
| 5,164,444 | 11/1992 | Bernard | 524/833 |
| 5,264,532 | 11/1993 | Bernard | 526/261 |
| 5,278,227 | 1/1994 | Bernard | 524/817 |
| 5,405,879 | 4/1995 | Uemae et al. | 523/201 |
| 5,461,103 | 10/1995 | Bafford et al. | 524/460 |
| 5,550,181 | 8/1996 | Scholz | 524/460 |

FOREIGN PATENT DOCUMENTS

| | | |
|---|---|---|
| 0037923B2 | 10/1981 | European Pat. Off. . |
| 0144723 | 6/1985 | European Pat. Off. . |
| 0522791 | 1/1993 | European Pat. Off. . |
| 3544882 | 11/1986 | Germany . |
| 61-264077 | 11/1986 | Japan . |
| WO9220722 | 11/1992 | WIPO . |
| 93/14161 | 7/1993 | WIPO . |
| 96/08320 | 3/1996 | WIPO . |

OTHER PUBLICATIONS

English–language translation of Japanese Patent No. 264, 077 (Nov. 1986).

*Primary Examiner*—Nathan M. Nutter
*Attorney, Agent, or Firm*—Christie, Parker & Hale, LLP

[57] ABSTRACT

General purpose inherently tacky acrylic pressure sensitive adhesive polymers formed of alkyl acrylates, vinyl esters, and saturated carboxylic acids, having improved properties, a lower residual monomer content are formed by a sequential emulsion polymerization process in which 40 to 70 percent, typically 45 percent, of the monomers are incrementally added to a reactor as a first charge containing substantially all of the vinyl esters, the balance of the monomers being fed in a second incremental charge.

38 Claims, 4 Drawing Sheets

PROCESS FOR THE PRODUCTION OF IMPROVED PSA'S

FIELD OF THE INVENTION

The present invention pertains to a process for reducing residual monomers in the formation of inherently tacky acrylic PSA emulsion copolymers containing copolymerized amounts of at least one vinyl ester and a multi-functional monomer and providing improved tackified adhesive properties.

BACKGROUND OF THE INVENTION

Inherently tacky pressure sensitive adhesive (PSA) acrylic polymers formed by emulsion polymerization are well known in the art as replacements for solution adhesive polymers.

The water borne pressure-sensitive adhesives utilize acrylic monomers to provide low glass transition temperatures (Tg) to the inherently tacky copolymer, unsaturated carboxylic acid monomers to enhance adhesion to polar surfaces and multifunctional monomers to improve cohesive strength with minimal loss of loop tack and other properties.

Vinyl esters, such as vinyl acetate are incorporated to enhance cohesive strength and peel adhesion and reduce cost but create problems in production. Typical residual vinyl ester monomer content has been high, ranging from about 0.5 to about 1 percent by weight of total monomers fed to the emulsion polymerization reactor. It is ecologically desirable to reduce residual monomer content in emulsion polymerization and to provide enhanced adhesive properties. This is the subject of the instant invention.

SUMMARY OF THE INVENTION

It is has now been found that residual monomer content in the polymerization of inherently tacky acrylic emulsion polymers containing at least one vinyl ester one can be significantly reduced while providing the ability to produce PSA's enhanced adhesive properties by use of a sequential polymerization process as described herein.

In the sequential polymerization process, there is incrementally fed a first charge of monomers constituting from 40 to about 70 percent, preferably 45 percent to about 55 percent, of the total monomers to form core polymer particles. Substantially all, and preferably all, of the vinyl esters are included in the first charge of monomers to an emulsion polymerization reactor. This is followed by incremental addition of the remaining monomers which are substantially free of vinyl esters. By following this procedure residual vinyl ester monomer content can be reduced to about 0.1 percent or less of total monomers fed to the reactor.

The inherently tacky, emulsion pressure-sensitive adhesive polymers of the instant invention comprise, on a polymerized basis and based on the total weight of the monomers forming the copolymer particles, at least one acrylate monomer having a homopolymerization glass transition temperature (Tg) of less than 0° C. The alkyl acrylate is one containing from about 4 to about 12 carbon atoms in the alkyl group, most preferably a mixture of 2-ethylhexyl acrylate and butyl acrylate. The total of alkyl acrylate monomers present is in an amount of from about 50 to about 90, preferably about 75 to about 90, percent by weight of the monomers.

The copolymer contains a polymerized amount of at least one hard monomer having a homopolymerization glass transition temperature (Tg) greater than about 0° C. and a multi-functional monomer.

More particularly, the inherently tacky emulsion pressure-sensitive adhesive polymers of the instant invention comprise, on a polymerized basis and based on the total weight of the polymer, at least one alkyl acrylate containing from about 4 to about 8 carbon atoms in the alkyl group, preferably a mixture 2-ethylhexyl acrylate and butylacrylate, said alkyl acrylates present in a total amount of from about 75 to about 90 percent by weight of monomers, at least one vinyl ester containing from 2 to about 16 carbon atoms in the alkyl chain of the acid, preferably vinyl acetate, said vinyl ester present in a total amount of from about 5 to about 20 percent by weight of the monomers; at least one unsaturated carboxylic acid containing from 3 to about 5 carbon atoms, preferably acrylic and/or methacrylic acid in a total amount from about 2 to about 6 percent by weight of monomers, and at least one multi-functional acrylate present in an amount of from 0 to about 1 percent by weight of the monomers. The emulsion copolymer typically has a glass transition temperature at least below use temperature, normally 25° C., typically of less than about −30° C.

The use of multifunctional monomers having an acrylate, or methacrylate functionality is presently preferred. The use of the multifunctional monomers give a significant improvement in cohesive strength (shear strength) without much loss of peel and loop tack even after tackification. The multifunctional monomers may be used with or without a chain transfer agent, and cross-linking agents, e.g. metal salts such as aluminum acetate.

The emulsion adhesive copolymers are optionally prepared using a reactive surfactant which polymerizes and becomes part of the emulsion polymer. The amount of reactive surfactant employed in the preparation of the emulsion pressure-sensitive adhesives of the present invention is in an amount of from 0 to about 0.4 percent by weight of the total monomers, typically from about 0.1 to about 0.25 percent by weight. Typical reactive surfactants are anionic vinyl functional surfactants, such as sodium vinyl sulfonate, sodium styrene sulfonate and the like.

The aforementioned polymers are prepared in accordance with this invention by sequential emulsion polymerization. This amounts to emulsion polymerization of a first incremental charge of monomers and catalyst comprising the aforementioned monomers and typically all of the vinyl ester monomers to be copolymerized. This is followed by a second incremental monomer charge which is substantially free of vinyl esters and relatively rich in unsaturated carboxylic acid. The total amount of monomers contained in the second charge is sufficient to consume substantially all the vinyl ester monomers left after the first charge.

For a first charge of about 45 percent of total monomers, vinyl acetate residue is expected to be about 0.1 to 0.3 percent of total monomers as compared to about 0.5 to 1 percent if all the monomers are fed incrementally over a continuous period of time.

Adhesive performance of tackified copolymers of the invention can be vastly improved if the tackifier used comprises a rosin ester, preferably rosin ester having an acid number of 0 to about 20 extended with a hydrocarbon to provide excellent adhesion to difficult to bond substrates such as recycled cardboard and high density polyolefins.

BRIEF DESCRIPTION OF THE DRAWINGS

The attached FIGS. 1 and 2 schematically illustrate the sequentially polymerized copolymers of this invention in comparison to a blend of copolymers particles wherein:

FIG. 2 depicts a physical blend of particles of monomers comprising the first charge and particles of monomers comprising the second charge while;

DETAILED DESCRIPTION

According to the present invention, there is provided an improved process for forming inherently tacky, acrylic PSA emulsion copolymer particles containing polymerized amounts of a vinyl ester such as vinyl acetate and novel adhesive products formed therefrom.

The polymerized copolymers comprise a first, or core copolymer formed from a first monomer charge comprised of at least one alkyl acrylate containing 4 to about 12 carbon atoms in the alkyl group, at least one vinyl ester, at least one unsaturated carboxylic acid monomer containing from 3 to about 5 carbon atoms and, optionally, an effective amount of at least one multi-functional monomer. The first copolymer is present in an amount of about 40 percent to about 70 percent, preferably of about 45 percent to 55 percent by weight of the provided copolymers. A second copolymer, is formed in the presence of the first copolymer from a second monomer charge which is free or substantially free of vinyl esters and contains a major amount of total unsaturated carboxylic acids.

This polymerization process is known as sequential polymerization. It is believed that the product is a domain-type emulsion copolymer in which the first or core particles form one domain and the second or shell copolymer forms a second domain which partially or continuously surrounds the core. By reserving a significant amount of the monomers to the second charge one can effectively use the monomers of the second charge to control adhesive properties.

Figure 1:
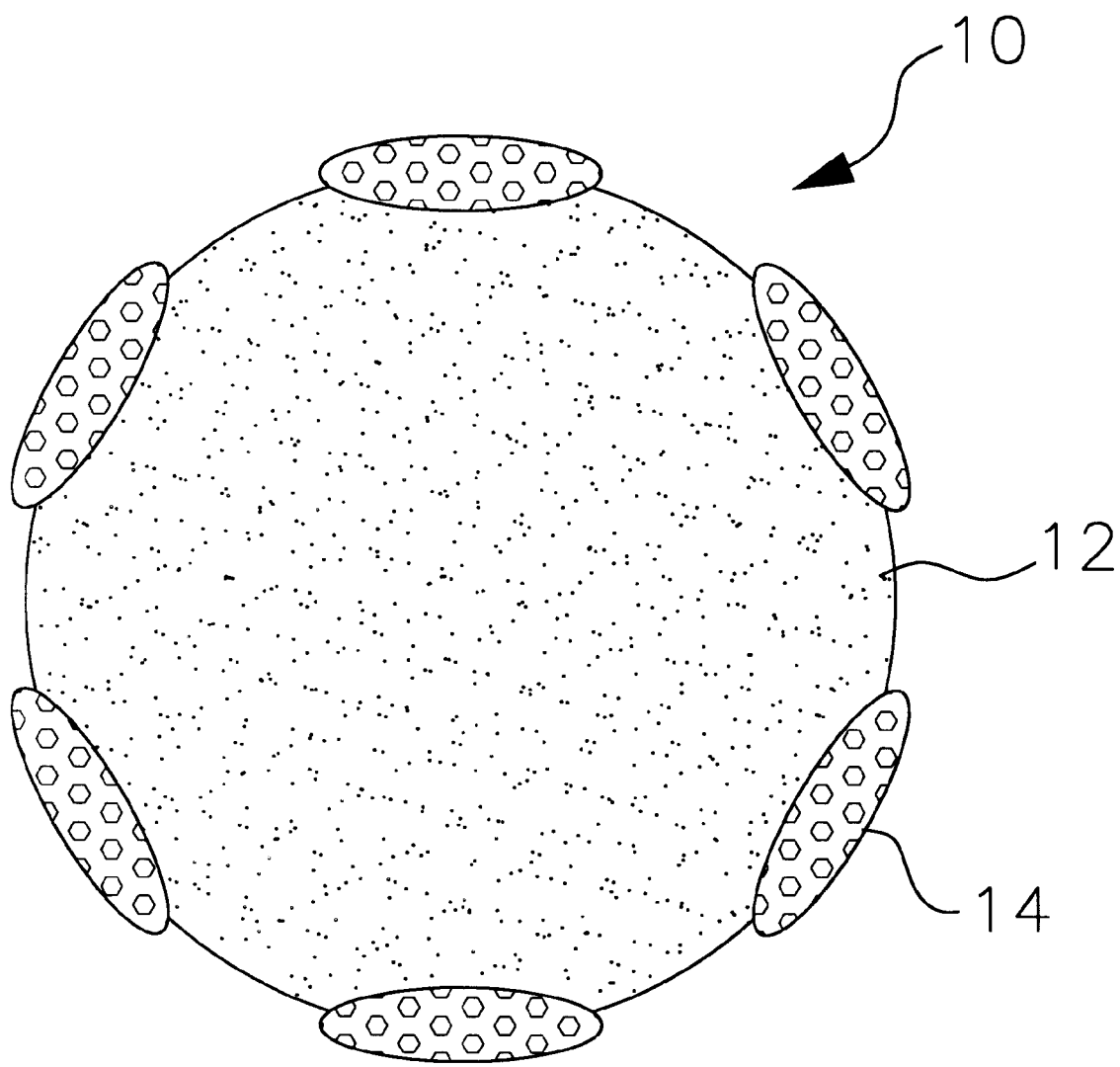
FIG. 1 depicts a sequentially polymerized copolymer particle.
Figure 2:
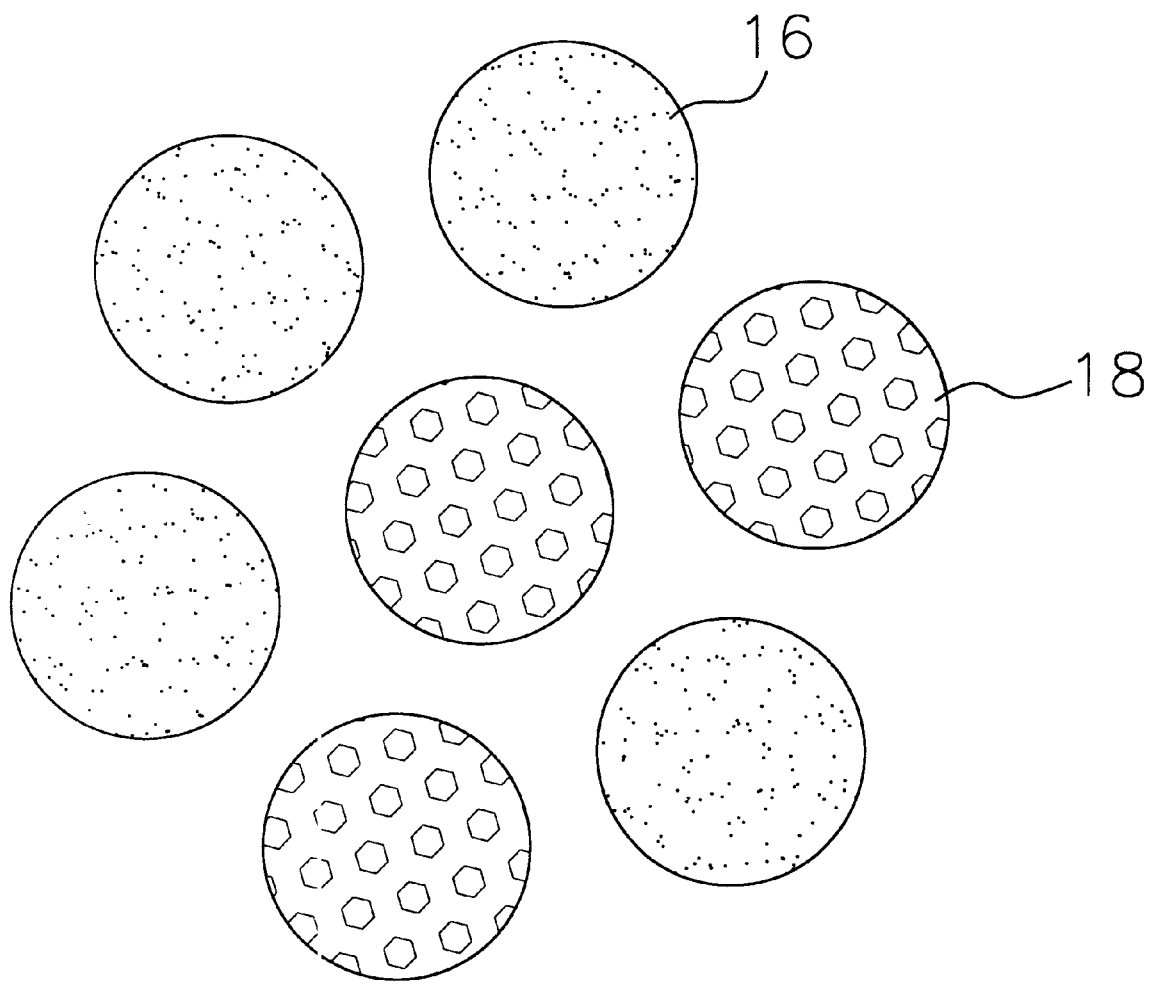

The two systems are depicted to FIGS. 1 and 2. With reference to FIG. 1, a sequentially polymerized copolymer particle is formed in emulsion as particle 10 and comprised of a central domain 12 completely or partially surrounded by second stage polymerized outer domain 14. In their formation, the monomers of the inner domain are polymerized first, followed by polymerization of the monomers forming the outer domain which associate with and are believed to attach to the initially formed inner domain copolymer particles.

As depicted in FIG. 2, if the individual copolymers are separately copolymerized and mixed, they form a random blend of core 16 and shell 18 copolymer particles with little or no attachment or association with each other.

The emulsion based pressure-sensitive adhesives of the instant invention contain, on a percent by total weight basis from about 50 to about 90, preferably from 75 to 90 percent by weight of total monomers subsequently polymerized, of at least one soft alkyl acrylate monomer containing about 4 to about 12 carbon atoms in the alkyl group and which have a glass transition temperature (Tg) of less than −25° C. Preferably, a mixture of alkyl acrylates are employed. Useful alkyl acrylates include n-butyl acrylate, 2-ethylhexyl acrylate, isooctyl acrylate and the like, with a mixture 2-ethylhexyl acrylate and butyl acrylate being preferred. These are "soft monomers" because of a low homopolymerization glass transition temperature (Tg). About 30 percent to about 40 percent of the total acrylate monomers are contained in the first charge.

The balance of the monomers comprise "hard monomers" having a homopolymerization Tg greater than about 0° C. They include methyl acrylate, vinyl esters, unsaturated carboxylic acids and methacrylates.

Vinyl esters are present in a total amount of from about 5 to about 20 percent by weight, preferably from about 10 to about 20 percent by weight based on total weight of the monomers, said vinyl esters containing from 2 to about 16 carbon atoms in the alkyl group of the ester. Representative vinyl esters include vinyl acetate, vinyl butyrate, vinyl propionate, vinyl isobutyrate, vinyl valerate, vinyl versitate, and the like. Vinyl acetate is preferred. The vinyl esters reduce cost and enhance cohesive strength and peel adhesion.

The inclusion of one or more unsaturated carboxylic acids containing from 3 to about 5 carbon atoms enhances cohesive strength, adhesion to polar surfaces and stabilizes the particles formed during emulsion polymerization. The unsaturated carboxylic acids are provided in an amount of from 2 to about 6 percent by weight of the polymer. The unsaturated carboxylic acids include, among others, acrylic acid, methacrylate acid, itaconic acid, and the like. Acrylic acid, methacrylate acid, and more preferably mixtures thereof, are presently preferred. Unsaturated carboxylic acid concentration in the first charge is from about 1 to about 3 percent by weight of monomers forming the first charge and from about 3 to about 6 percent of monomers forming the second charge.

Cohesive strength may be enhanced by inclusion of an alkyl methacrylate containing from 1 to about 8 carbon atoms in the alkyl group and present in an amount of from 0 to 10 percent by weight of the monomers. Methyl methacrylate is presently preferred. Diesters of dicarboxylic acids may also be used and if used are preferably in the first charge.

The emulsion adhesives of the instant invention are optionally prepared in the presence of a reactive surfactant which polymerizes during formation of the polymer and becomes an integral part of the polymer. Reactive surfactants include anionic vinyl functional monomers such as sodium vinyl sulfonate, sodium styrene sulfonate and the like. The reactive surfactant is normally present as part of the total surfactant system and in an amount of from 0 to about 0.4 percent by weight of the total monomers.

Another component may be a reactive multifunctional monomer which is an acrylate and/or methacrylate preferably having a present in an amount of from 0.1 to about 1 percent by weight of the monomers. The multifunctional monomers improve guillotinability without adversely affecting adhesive properties. Multi-functional monomers include tris-(2-hydroxy ethyl)isocyanurate triacrylate and bis-(methylacryloxyethyl) phosphate, tripropylene glycol diacrylate and the like. Still another component may be a chelating monomer.

Presently preferred emulsion polymers contain, exclusive of reactive monomers, about 10 to 20 percent by weight 2-ethylhexyl acrylate, about 60 to 80 percent by weight butyl acrylate, about 5 to 20 percent by weight vinyl acetate, about 1 to about 2 percent by weight acrylic acid, and about 1 to about 2 percent by weight methacrylic acid.

The monomer proportions are normally adjusted in such a way that the adhesive has a glass transition temperature less than about −20° C., giving a good balance of adhesion and tack at room temperature and cold temperatures.

Figure 3:
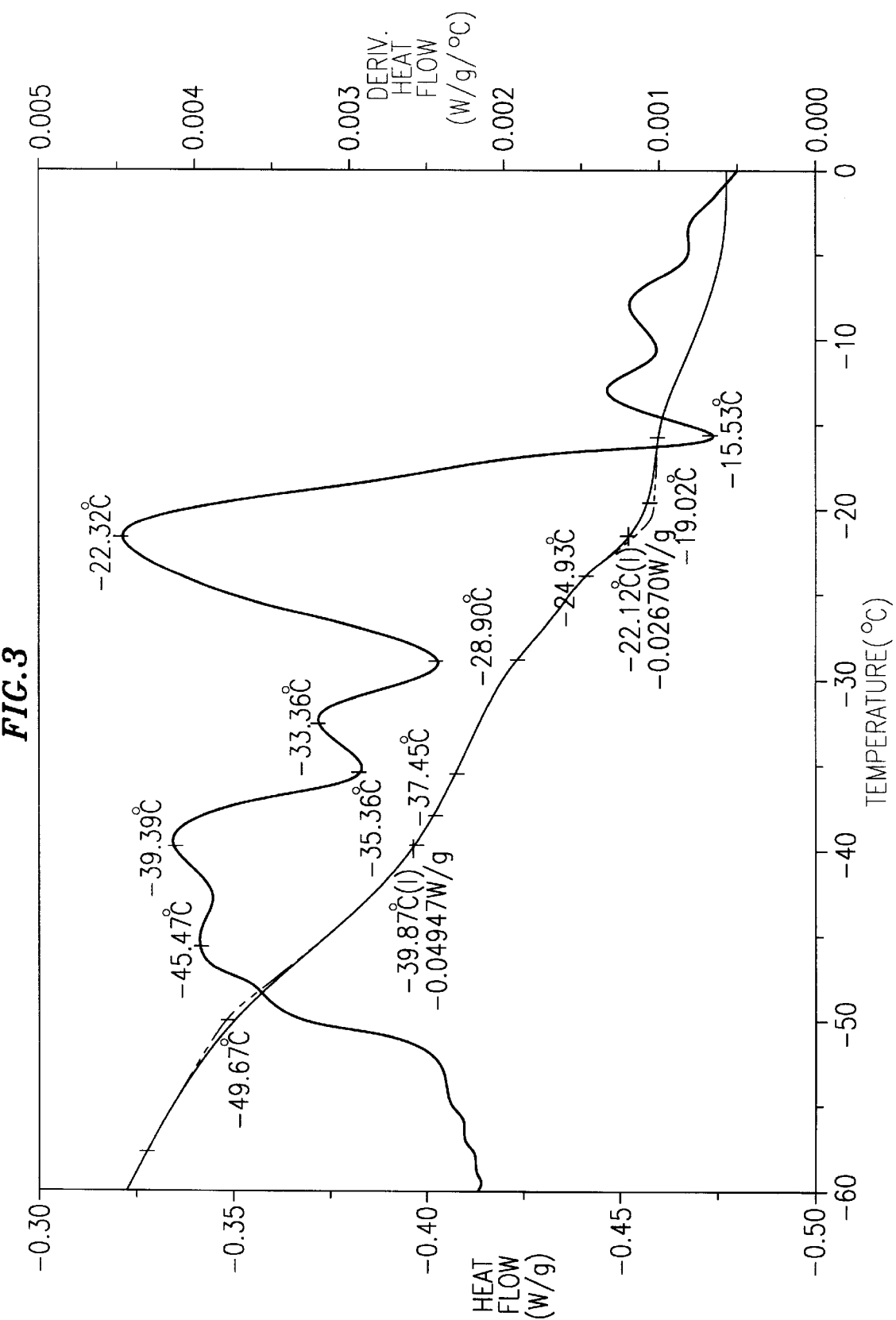
FIG. 3 is a differential scanning calorimeter plot of the copolymer, formed in Example 1
Figure 4:
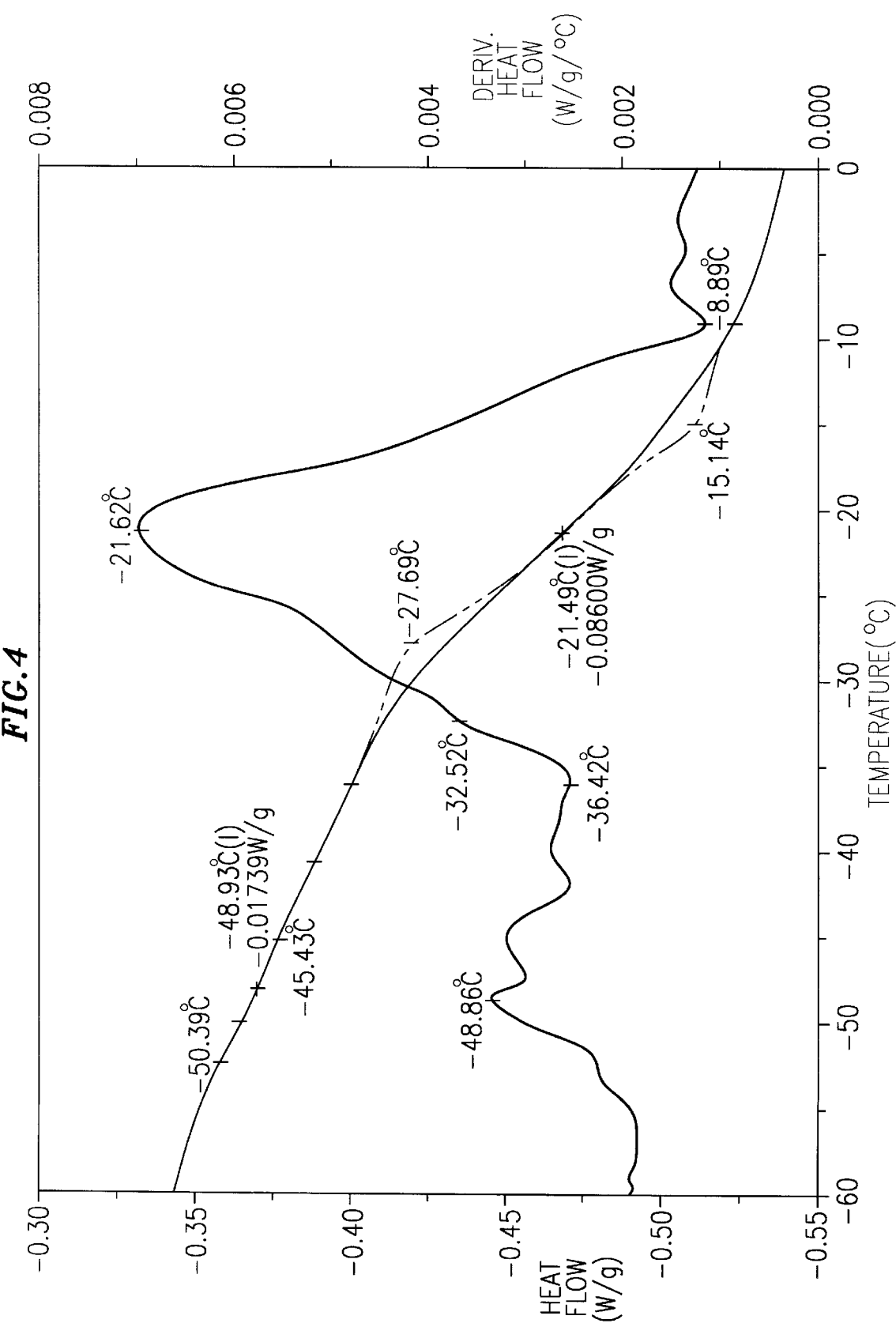
FIG. 4 shows the plot for the tackified adhesive of Example 2.

Because of different monomer content, the core copolymer will have a glass transition temperature different from the shell copolymer. FIG. 3 shows the multiple glass transition temperatures over a wide range which gives good adhesive performance over a wide temperature range. As shown in FIG. 4 tackification changes the Tg peaks but also provides multiple peaks over a broad temperature range.

The preferred gel content or percent insolubles are in excess of 50 percent by weight which provides excellent cohesive strength and high performance. In this regard, gel represents the amount of polymer which is insoluble in tetrahydrofuran expressed in percent by weight and determined by the membrane gel partitioning method. In this method, about 600 to 800 milligrams of 100 percent solid polymer is weighed onto a millipore membrane disk of 5 micrometer porosity. The disk is heat sealed and transferred to a scintillation vial. About 20 milliliters of tetrahydrofuron is added to the vial and the vial is rotated on a shaker for 16 to 24 hours. The sealed disk is then removed, washed with tetrahydrofuran, and dried first by placing it on a Whatman No. 1 filter paper, followed by exposure to 100° C. in the oven for a few hours. The dried disk is weighed and the insoluble portion of the polymer determined by the equation:

$$\text{Percent insoluble} = \frac{(b-c) \times 100}{a} = \% \text{ gel}$$

wherein   a = total weight of 100 percent solids polymer
b = the weight of the polymer plus membrane before tetrahydrofuron treatment
c = polymer plus membrane remaining after tetrahydrofuron treatment.

Other aids which may be used to develop cross-linking include thermal cross-linking and cross-linking by actinic and electron beam radiation.

The polymers of the instant invention are prepared by sequential emulsion polymerization under conditions of agitation in an autogenous atmosphere in the presence of suitable polymerization initiators such as peroxydisulfate and peroxides. Depending on desired polymer properties including gel content, the preferred levels of these initiators are in the range of from about 0.5 to about 1.0 percent by weight based on the total weight of the monomers. The presently preferred initiators are potassium persulphate, t-butyl hydrogen peroxide, and the like.

The emulsion copolymers are prepared in accordance with the present invention by polymerizing the monomers to yield a first or inner domain copolymer containing the polymerized vinyl esters and some of the carboxylic acids, and a second or outer domain copolymer is substantially free of vinyl esters and preferably contains a major amount of polymerized unsaturated carboxylic acids.

Reaction can be initiated thermally by thermal decomposition of the initiator yielding free radicals. Reaction can also be initiated by addition of a redox catalyst system. Thermal initiation is preferred.

Catalysts, such as potassium persulphate, tertiary butyl hydroperoxide and the like, once redox catalysts such as sodium meta-bisulfite and the like, are employed for polymerization and present in an amount of from about 0.15 to about 0.5 part by weight per 100 parts weight monomers with surfactant levels ranging from about 0.5 to about 5 percent by weight based on weight of the monomers being preferred. Reaction temperature generally ranges from about 65 to about 85° C. and pH ranges from about 2 to about 4 or more if a buffer is employed.

There may be included "chain-transfer agents" by which there is meant organic compounds containing mono- or multi-mercaptan groups, chlorinated groups, hydroxy groups, and the like, as are known in the art. The presently preferred chain transfer agents are n-dodecyl mercaptan and t-dodecyl mercaptan provided in a concentration from about 0.01 to about 0.1 percent by weight of the monomers.

The first and if desired, the second copolymer particles may be cross-linked by use of an internal cross-linking agent. Internal cross linking is intended to mean cross-links between chains as opposed to external cross-links which are between preformed emulsion particles. Internal cross linking agents include polyfunctional compounds having at least two nonconjugated carbon-carbon double bonds per molecule which then become part of the polymer during polymerization. It has been found that the amount of internal cross linking agents should not exceed about 3 percent by weight of the total monomer content as no additional benefit is typically observed at higher levels. Examples of suitable internal cross linking agents include diallyl maleate, diallyl phthalate and multifunctional acrylates and methacrylates. Tripropylene glycol diacrylate is preferred. The polymer composition may further comprise an external cross linking agent to further modify adhesive properties which cause post polymerization cross linking. External cross linking agents include metal salts such as zirconium ammonium carbonate, zinc ammonium carbonate, aluminum acetate, zinc acetate and chromium acetate. The presently preferred external cross linking agent is zirconium ammonium carbonate.

The inclusion of multifunctional monomers enable the monomers to undergo internal cross linking reactions and allow chain transfer agents to control chain length. This differs from externally cross-linked polymers in that the functional groups, such as carboxyl, hydroxyl, and/or amino groups, remain free and available for improving adhesive properties, available for external cross-linking reactions such as by exposure to actinic or electron beam radiation and/or through external cross-linking agents.

As indicated above, for the process of copolymer manufacture it is desirable to employ a surfactant system present in the amount of from about 0.5 to about 5 parts by weight to 100 parts by weight monomers, preferably about 1.8 parts per 100 parts by weight of the monomers. The presently preferred surfactant system is an anionic surfactant system. One such surfactant system contains 35 percent by weight of the disodium ethoxylated alcohol half ester of sulfo succinic acid, 12.1 percent by weight of sodium dioctyl sulfo succinate and 53.98 percent by weight sodium lauryl ether sulfate. The combination of anionic surfactants enables the formation of a stable suspension of the acrylic based emulsion copolymers of the invention.

At the conclusion of the addition of monomers containing the vinyl esters there is incrementally added a remaining charge of monomers which are preferably free of the vinyl esters. The presently preferred method is to include about 45 percent of total monomers as the first monomer charge forming the core copolymer followed by 55 percent of the monomers forming the shell. Sequential polymerization results in a residual monomer content of about 0.1 to about 0.3 percent of total monomers. At the conclusion of the reaction, there is added a catalyst system which will reduce any residual vinyl ester monomer content to less than about 0.05 percent after 24 hours.

Inherently tacky adhesive copolymers of the invention may be used as such or when tackified or plasticized. While conventional tackifiers and plasticizers may be used, it is presently preferred when the polymers are tackified with rosin ester tackifiers having an acid number from 0 to about 20, preferably about 5 to 15 most preferably about 8 to 10 such as tackifiers sold by Eka Nobel as Snowtack 920. Tackification to a level of 28 parts by weight tackifier per 100 parts by weight polymer provides an adhesive composition of an excellent balance of properties of adhesion to cardboard and low energy surface. The amount of tackifiers range from 5 to about 50, more preferably from about 20 to about 30 parts by weight per 100 parts by weight polymer.

The following example illustrates the preparation of the best mode sequentially polymerized copolymers of the instant invention.

In the following Table 1, the following abbreviations have the meaning shown:

T.S.P.P.: tetrasodium pyrophosphate

Aerosol OT-75: sodium dioctyl sulphosuccinate surfactant manufactured and sold by Cyanamid.

Aerosol A 102: disodium ethoxylated alcohol (C10–C12) half ester of sulfo succinic acid manufactured and sold by Cyanamid.

Disponil FES 77: sodium lauryl ether sulfate surfactant manufactured and sold by Henkel.

2EHA: 2-Ethylhexyl acrylate

BA: Butyl Acrylate

MA: Methylacrylate

VAC: Vinyl Acetate

MAA: Methacrylic acid

AA: Acrylic Acid

TPGDA: Tripropylene glycol diacrylate

NDDM: n dodecyl mercaptan

K-persulphate: potassium persulphate

EXAMPLE 1

With reference to Table 1 below, there was formed Soap Solution to which there was added Monomer Mix (1) with agitation to form a pre-emulsion. Monomer Mix (2) and Catalyst Solution were formed for later addition. All ingredients except potassium (K) persulphate of the Initial Reactor Charge were incrementally fed to a stirred reactor. The charge was heated to 75° C. under agitation and purged with nitrogen to form autogenous condition. Potassium persulphate was added to the reactor, mixed for 5 minutes and the pre-emulsion was fed at the rate of about 3 parts by weight per minute for 120 minutes Catalyst Solution was fed at 0.22 part by weight per min for 227 minutes. Reaction temperature was kept between 78 and 85° C. The charge of Monomer Mix (2) began 90 minutes after completion of addition by the pre-emulsion and was added at 3.7 parts by weight/minute for 20 minutes and reaction held for another 60 minutes. There was then added a Cookoff Catalyst and the reactor was then cooled to 30° C. The ammonia and defoamer solution w as added at 45° C. and biocide solution at 35° C. Residual monomer content of 0.03 percent vinyl acetate, 0.02 percent 2-ethylhexyl acrylate and less than 0.01% butylacrylate.

TABLE 1

| Soap Solution | Parts by Weight (%) |
| --- | --- |
| De-ionized H$_2$O | 60.26 |
| T.S.P.P. (59.70%) | 1.87 |
| Aerosol OT-75 | 1.17 |
| Aerosol A-102 | 12.28 |
| Disponil FES-77 | 19.42 |

TABLE 1-continued

| | | |
| --- | --- | --- |
| Total | 95.00 | |
| Monomer Mix | (1) | (2) |
| 2-ethylhexyl acrylate (2-EHA) | 38.95 (14.33) | 38.95 (11.71) |
| Butylacrylate (BA) | 168.90 (62.19) | 277.55 (83.47) |
| Vinyl acetate (VAC) | 56.14 (20.65) | — — |
| Tripropylene glycol diacrylate (TRPGDA) | 1.37 (0.50) | 1.68 (0.5) |
| Methylacrylate (MA) | 0.60 (0.22) | — — |
| Methacrylic acid (MAA) | 2.34 (0.86) | 8.77 (2.64) |
| Acrylic acid (AA) | 3.16 (1.16) | 5.38 (1.61) |
| Dodecylmercaptan (N-DDM) | 0.35 (0.12) | 0.23 (0.07) |
| Total | 271.81 (100) | 332.51 (100) |
| Catalyst Solution For Incremental Addition | | |
| De-ionized H$_2$O | 48.36 | |
| K-persulphate | 1.64 | |
| Total | 50.00 | |
| Initial Reactor Charge | | |
| De-ionized H$_2$O | 236.78 | |
| Na-bicarbonate | 0.10 | |
| K-persulphate | 2.10 | |
| Total | 238.98 | |
| Cookoff Catalyst 6-BHP (70%) | 0.10 | |
| Ammonia, Defoamer and Biocide | | |
| 14% Ammonia Solution | 6.00 | |
| Drewplus L-191 | 0.30 | |
| Kathon LX | 0.30 | |
| Total | 6.60 | |
| Rinse Water | 5.00 | |
| De-ionized H$_2$O | | |
| Grand Total | 1000.00 | |

Theoretical Total Solids: 62.07% PH: 6.5–7.0
Viscosity: 2,000–3,000 cps., #3 spindle/30 rpm/25 C/LVT

EXAMPLE 2

The emulsion of Example 1 was tackified with an anionic/nonionic stabilized disproportionate rosin glycol ester having an acid value less than 20, known as Snowtack 920, manufactured by EKA Nobel Paper Chemicals and Resins B.V., The Netherlands, under agitation and mixture filtered through aseptic filter to give a product of the composition shown in Table 2. The tackified emulsion polymer was transfer coated on to a silicon release liner then laminated to 50 lb. DSX paper. Coat weight was 20–23g/m$^2$. Average adhesive properties are shown in Table 3.

TABLE 2

| | Parts by Weight (Dry on Dry Basis) | % |
| --- | --- | --- |
| Example I | 100.00 | 78.12 |
| Snowtack 920 (Akzo Nobel) | 28.00 | 21.88 |
| Total | 128.00 | 100.00 |

TABLE 3

Average Adhesive Properties

90° Peel Adhesion: N/m., 10 minute-dwell

| | |
|---|---|
| Untreated HDPE Panel: | 387.0 pt (pt: paper tear) |
| Recycled Corrugated: | 176.9 MFP (mfp: moderate fiber pick) |

Loop Tack: N/m.,

| | |
|---|---|
| Untreated HDPE Panel: | 581.4 |
| Recycled Corrugated: | 306.5 |

2° Shear Adhesion: min., ½" × ½"/500 q/23° C./ 50% RH

| | |
|---|---|
| Stainless Steel: | 234.8c (c: cohesive failure) |

The above adhesive values were based on an average of three runs, with five randomized samples. Peel was determined using test PSTC Test No. 2–6th edition, Loop tack by PSTC Test No.5–6th edition with the exception that the roll down for the 90° peel was an 8-lb roller in five repetitions. The materials were conditioned and tested under Tappi conditions of 50 percent RH at 72° F.

Residual monomer content was determined using gas chromatography when a known amount of polymer was dissolved in tetrahydrofuran and a solution analyzed by gas chromatography for residual monomer content. The residual monomers are separated on a fuzed silica column as a polar stationary phase using a helium gas mobile phase. The residual monomer is:

$$\frac{\text{weight of residue monomer}}{\text{weight of sample}} \times 100$$

What is claimed is:

1. A sequential polymerization process for the production of inherently tacky, pressure-sensitive adhesive emulsion polymer particles from a total monomer charge comprising:
   (i) at least one alkyl acrylate containing from about 4 to about 12 carbon atoms in the alkyl group and present in a total amount of about 50 to about 90 percent by weight of the monomers;
   (ii) at least one vinyl ester containing from about 2 to about 16 carbon atoms in the alkyl chain of the acid, the total of the vinyl esters being present in an amount of 5 to about 20 percent by weight of the monomers;
   (iii) from 2 to about 6 percent by weight of the monomers of at least one unsaturated carboxylic acid; and
   (iv) from 0 to about 1 percent by weight of the monomers of a multifunctional monomer;
   said process comprising incrementally feeding under autogenous conditions a first monomer charge containing from about 40 to about 70 percent by weight of the total monomers and substantially all of said vinyl ester and a polymerization catalyst to an emulsion polymerization reactor and polymerizing the first charge in the presence of the catalyst over a first period of time and thereafter incrementally feeding to the reactor a second charge comprised of the remainder of the monomers while maintaining autogenous conditions, said polymerization occurring in the presence of a stabilizer system for the sequentially polymerized emulsion polymer particles.

2. A sequential polymerization process for the production of inherently tacky, pressure-sensitive adhesive emulsion polymer particles which comprise:
   (i) at least one alkyl acrylate containing from about 4 to about 8 carbon atoms in the alkyl group and present in a total amount of about 50 to about 90 percent by weight of the monomers;
   (ii) at least one vinyl ester containing from about 2 to about 16 carbon atoms in the alkyl chain of the acid, the total of the vinyl esters being present in an amount of 5 to about 20 percent by weight of the monomers;
   (iii) from about 2 to about 6 percent by weight of the monomers of at least one unsaturated carboxylic acid; and
   (iv) from 0 to about 1 percent by weight of the monomers of a multifunctional monomer;
   said process comprising incrementally feeding a first monomer charge containing about from 40 to about 70 percent by weight of the total monomers and containing from about 30 to about 40 percent of the total alkyl acrylate monomers, the unsaturated carboxylic acid in an amount about 1 to about 3 percent by weight of monomers forming the first monomer charge and substantially all of the vinyl ester and a polymerization catalyst to an emulsion polymerization reactor and polymerizing the first charge under autogenous conditions over a first period of time and while maintaining autogenous conditions, thereafter, incrementally feeding as a second charge, the balance of the monomers and catalyst to the reactor, said second charge containing unsaturated carboxylic acid in an amount of from about 3 to about 5 percent of monomers forming the second charge, said sequential polymerization in the presence of a stabilizer system for the formed sequentially polymerized emulsion polymer particles.

3. A process is claimed in claim 1 in which the first charge of monomers contains from about 45 to 55 percent of total monomers fed to the reactor.

4. A process is claimed in claim 2 in which the first charge of monomers contains from about 45 to 55 percent of total monomers fed to the reactor.

5. A process as claimed in claim 1 in which the alkyl acrylate is selected from the group consisting of 2-ethylhexyl acrylate, butyl acrylate and mixtures thereof.

6. A process as claimed in claim 2 in which the alkyl acrylate is selected from the group consisting of 2-ethylhexyl acrylate, butyl acrylate and mixtures thereof.

7. A process as claimed in claim 3 in which the alkyl acrylate is selected from the group consisting of 2-ethylhexyl acrylate, butyl acrylate and mixtures thereof.

8. A process as claimed in claim 4 in which the alkyl acrylate is selected from the group consisting of 2-ethylhexyl acrylate, butyl acrylate and mixtures thereof.

9. A process as claimed in claim 1 in which the vinyl ester is present in an amount of about 10 to about 20 percent by weight of the total monomers.

10. A process as claimed in claim 2 in which the vinyl ester is present in an amount of about 10 to about 20 percent by weight of the total monomers.

11. A process as claimed in claim 3 in which the vinyl ester is present in an amount of about 10 to about 20 percent by weight of the total monomers.

12. A process as claimed in claim 4 in which the vinyl ester is present in an amount of about 10 to about 20 percent by weight of the total monomers.

13. A process as claimed in claim 8 in which the vinyl ester is present in an amount of about 10 to about 20 percent by weight of the total monomers.

14. A process as claimed in claim 1 in which the vinyl ester is vinyl acetate.

15. A process as claimed in claim 2 in which the vinyl ester is vinyl acetate.

16. A process as claimed in claim 13 in which the vinyl ester is vinyl acetate.

17. A process as claimed in claim 1 in which the unsaturated carboxylic acid is selected from the group consisting of acrylic acid, methacrylic acid and mixtures thereof.

18. A process as claimed in claim 2 in which the unsaturated carboxylic acid is selected from the group consisting of acrylic acid, methacrylic acid and mixtures thereof.

19. A process as claimed in claim 16 in which the unsaturated carboxylic acid is selected from the group consisting of acrylic acid, methacrylic acid and mixtures thereof.

20. A process as claimed in claim 1 in which following conclusion of reaction the inherently tacky emulsion polymer particles are tackified with a rosin ester having an acid member from 0 to about 20.

21. A process as claimed in claim 2 in which following conclusion of reaction the formed inherently tacky emulsion polymer particles are tackified with a rosin ester having an acid member from 0 to about 20.

22. A process as claimed in claim 4 in which following conclusion of reaction the formed inherently tacky emulsion polymer particles are tackified with a rosin ester having an acid member from 0 to about 20.

23. A process as claimed in claim 19 in which following conclusion of reaction the formed inherently tacky emulsion polymer particles are tackified with a rosin ester having an acid member from 0 to about 20.

24. Processes claimed in claim 20 in which the tackifier if present in an amount of from about 20 to about 100 parts by weight per 100 parts by weight polymer particles.

25. Processes claimed in claim 22 in which the tackifier if present in an amount of from about 20 to about 30 parts by weight per 100 parts by weight polymer particles.

26. Processes claimed in claim 23 in which the tackifier if present in an amount of from about 20 to about 30 parts by weight per 100 parts by weight polymer particles.

27. A sequential polymerization process for the production of inherently tacky, pressure-sensitive adhesive emulsion polymer particles which comprise:
(i) a mixture of butylacrylate and 2-ethylhexyl acrylate present in a total amount of about 75 to about 90 percent by weight of the monomers;
(ii) vinyl acetate present in an amount of 5 to about 20 percent by weight of the monomers;
(iii) from about 1 to about 2 percent by weight of the monomers of each acrylic acid and methacrylic acid; and
(iv) about 0.1 to about 1 percent by weight of propane glycol diacrylate;
said process comprising incrementally feeding a first monomer charge containing about from 45 to about 55 percent by weight of the total monomers; and
from about 30 to about 40 percent of the total ethyl acrylate and butylacrylate monomers, the acrylate and methacrylate acids in a total amount about 1 to about 3 percent by weight of monomers forming the first monomer charge and substantially all of the vinyl acetate and a polymerization catalyst to an emulsion polymerization reactor and polymerizing the first charge under autogenous conditions over a first period of time while maintaining autogenous conditions and, thereafter, incrementally feeding as a second charge, the balance of the monomers to the reactor, said second charge containing acrylic acid and methacrylic acid in an amount of from about 3 to about 5 percent of monomers forming the second charge, said sequential polymerization in the presence of a stabilizer system for the formed sequentially polymerized emulsion polymer particles.

28. A process as claimed in claim 20 in which following conclusion of reaction the formed inherently tacky emulsion polymer particles are tackified with a rosin ester having an acid member from 0 to about 20 present in an amount of from about 20 to about 30 parts by weight per 100 parts by weight polymer particles.

29. Inherently tacky, pressure-sensitive adhesive emulsion polymer particles comprised of:
(i) at least one alkyl acrylate containing from about 4 to about 8 carbon atoms in the alkyl group and present in a total amount of 50 to about 90 percent by weight of the monomers;
(ii) at least one vinyl ester containing from about 2 to about 16 carbon atoms in the alkyl chain of the acid, the total of the vinyl esters being present in an amount of 5 to about 20 percent by weight of the monomers;
(iii) about 2 to about 6 percent by weight of the monomers of at least one unsaturated carboxylic acid; and
(iv) from 0 to about 1 percent by weight multifunctional monomer;
said emulsion polymer particles formed by sequential emulsion polymerization of a first monomer charge containing from about 40 to about 70 percent by weight of total monomers and substantially all of the vinyl ester and unsaturated carboxylic acid in an amount of from about 1 to about 3 percent by weight of monomers forming the first charge followed by emulsion polymerization of a second monomer charge comprised of the remainder of the total monomers and containing carboxylic acids in an amount of from about 3 to about 5 percent by weight of monomers forming the second charge.

30. Pressure sensitive adhesive polymer particles was claimed in claim 24 in which the acrylate is selected from the group consisting of 2-ethylhexyl acrylate, butyl acrylate and mixtures thereof.

31. Pressure sensitive adhesive polymer particles as claimed in claim 29 in which the vinyl ester is present in a total amount of from about 10 to about 20 percent by weight based on total monomers.

32. Pressure sensitive adhesive polymer particles as claimed in claim 31 in which the vinyl ester is vinyl acetate.

33. Pressure sensitive adhesive polymer particles as claimed in claim 32 in which the vinyl ester is vinyl acetate.

34. Pressure sensitive adhesive polymer, as claimed in claim 29, in which the diester of the unsaturated carboxylic acid is selected from the group consisting of acrylic acid, methacrylic acid and mixtures thereof.

35. Pressure sensitive adhesives as claimed in claim 28 in which the unsaturated carboxylic acid is selected from the group consisting of acrylic acid, methacrylic acid and mixtures thereof.

36. Inherently tacky, pressure-sensitive adhesive emulsion polymer particles comprised of:
(i) at least one alkyl acrylate containing from about 4 to about 8 carbon atoms in the alkyl group and present in a total amount of 60 to about 80 percent by weight of the monomers;
(ii) vinyl acetate present in an amount from about 5 to about 20 percent by weight of the monomers;
(iii) from about 2 to about 6 percent by weight of the monomers of at least one unsaturated carboxylic acid; and (iv) from about 0.1 to about 1 percent by weight of monomers of a multifunctional monomer;

said emulsion polymer particles formed by sequential emulsion polymerization of a first monomer charge containing from about 45 to about 55 percent by weight of total monomers and substantially all of the vinyl acetate and containing from 1 to about 3 percent by weight carboxylic acid followed by emulsion polymerization of a second monomer charge comprised of the remainder of the total monomers and containing from about 3 to about 5 percent unsaturated carboxylic acid and tackified with a rosin ester having an acid number of from 0 to about 20.

37. Pressure sensitive adhesive polymer particles as claimed in claim 36 in which the rosin ester is present in an amount from about 20 to about 30 parts per 100 parts by weight polymer particles.

38. Pressure sensitive adhesive polymer particles as claimed in claim 36 in which the rosin ester is present in an amount of about 28 parts per 100 parts by weight polymer particles.

* * * * *

UNITED STATES PATENT AND TRADEMARK OFFICE
CERTIFICATE OF CORRECTION

| | |
|---|---|
| PATENT NO. | : 6,107,382 |
| DATED | : August 22, 2000 |
| INVENTOR(S) | : Charles R. Williams, Colin C. Smith, James R. Bodwell, James P. Akeley and Ivan S. Lee |

It is certified that error appears in the above-identified patent and that said Letters Patent is hereby corrected as shown below:

Column 11,
Line 30, replace "Processes claimed" with -- A process as claimed --; and "if present" with -- is present --.
Line 33, replace "Processes claimed" with -- A process as claimed --; and "if present" with -- is present --.
Line 36, replace "Processes claimed "with -- A process as claimed --; and "if present" with -- is present --.

Column 12,
Line 37, replace "was" with -- as --.

Signed and Sealed this

Second Day of July, 2002

Attest:

JAMES E. ROGAN
Attesting Officer
Director of the United States Patent and Trademark Office